United States Patent
Chapman

(10) Patent No.: US 8,358,622 B2
(45) Date of Patent: Jan. 22, 2013

(54) METHOD OF RESOURCE ALLOCATION IN A COMMUNICATION SYSTEM

(75) Inventor: Thomas Malcolm Chapman, Southampton (GB)

(73) Assignee: Nokia Siemens Network Oy, Espoo (FI)

( * ) Notice: Subject to any disclaimer, the term of this patent is extended or adjusted under 35 U.S.C. 154(b) by 555 days.

(21) Appl. No.: 12/161,306

(22) PCT Filed: Dec. 20, 2006

(86) PCT No.: PCT/GB2006/050469
§ 371 (c)(1),
(2), (4) Date: Feb. 14, 2011

(87) PCT Pub. No.: WO2007/083081
PCT Pub. Date: Jul. 26, 2007

(65) Prior Publication Data
US 2011/0142002 A1    Jun. 16, 2011

(30) Foreign Application Priority Data

Jan. 17, 2006  (GB) .................. 0600814.8
Feb. 7, 2006   (GB) .................. 0602397.2

(51) Int. Cl.
H04J 4/00         (2006.01)
(52) U.S. Cl. .................. 370/330; 370/436; 370/343
(58) Field of Classification Search .......... 370/330, 370/343, 480
See application file for complete search history.

(56) References Cited

U.S. PATENT DOCUMENTS

| | | | |
|---|---|---|---|
| 6,895,248 B1 | 5/2005 | Akyol et al. | |
| 7,684,505 B2 * | 3/2010 | Rajagopal et al. | 375/265 |
| 2002/0080820 A1 | 6/2002 | Hashem et al. | |
| 2003/0032356 A1 | 2/2003 | Haumonte et al. | |
| 2003/0210712 A1 * | 11/2003 | Cai et al. | 370/498 |
| 2005/0197136 A1 * | 9/2005 | Friday et al. | 455/456.1 |
| 2006/0083211 A1 * | 4/2006 | Laroia et al. | 370/343 |
| 2007/0110104 A1 * | 5/2007 | Sartori et al. | 370/480 |

FOREIGN PATENT DOCUMENTS

| | | |
|---|---|---|
| EP | 1 039 683 A2 | 9/2000 |
| RU | 2 196 392 C2 | 1/2003 |
| WO | 97/35449 | 9/1997 |
| WO | 02/093819 A1 | 11/2002 |
| WO | 2005/096532 A1 | 10/2005 |
| WO | 2005/122458 A1 | 12/2005 |
| WO | 2006/044489 A1 | 4/2006 |

OTHER PUBLICATIONS

Russian Office Action issued Nov. 22, 2010 in corresponding Russian Patent Application 2008133575.
International Search Report for Application No. PCT/GB2006/050469; mailed May 4, 2007.

* cited by examiner

*Primary Examiner* — Dang Ton
*Assistant Examiner* — Pamit Kaur
(74) *Attorney, Agent, or Firm* — Staas & Halsey LLP

(57) ABSTRACT

Resources are allocated in a communication system by setting specific time and frequency chunks within a band to provide localized and distributed resources for each of localized and distributed users. The signalling of resource allocation for each user is in the chunk at the same frequency range as the frequency range of the allocated resource, or a subset of the frequency range of the allocated resource.

18 Claims, 10 Drawing Sheets

FIG 1
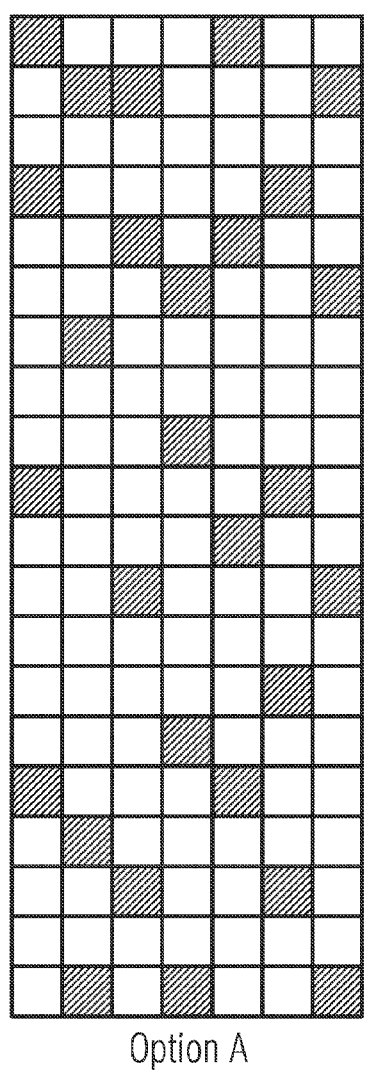
Option A
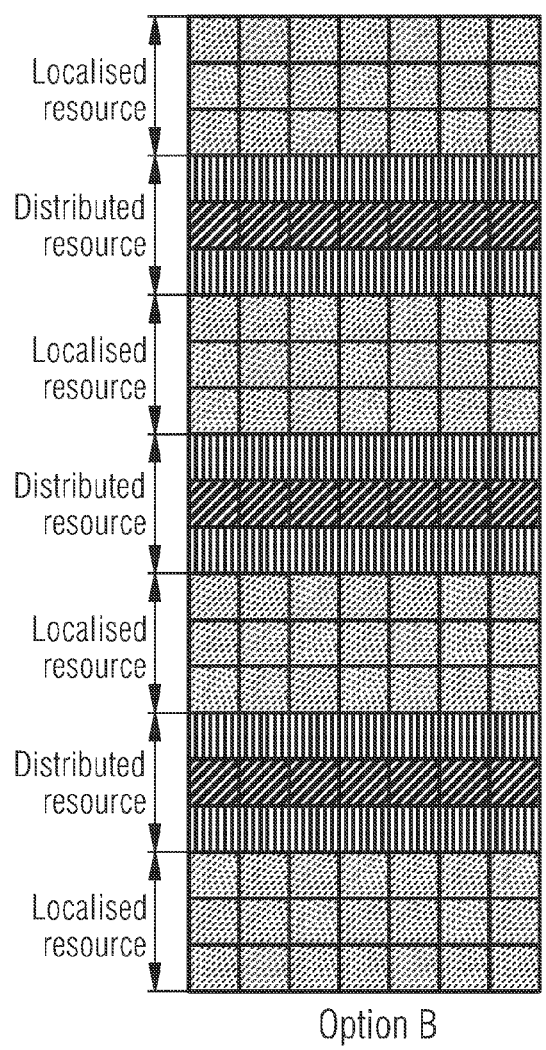
Option B
Localised resource
Distributed resource
Localised resource
Distributed resource
Localised resource
Distributed resource
Localised resource

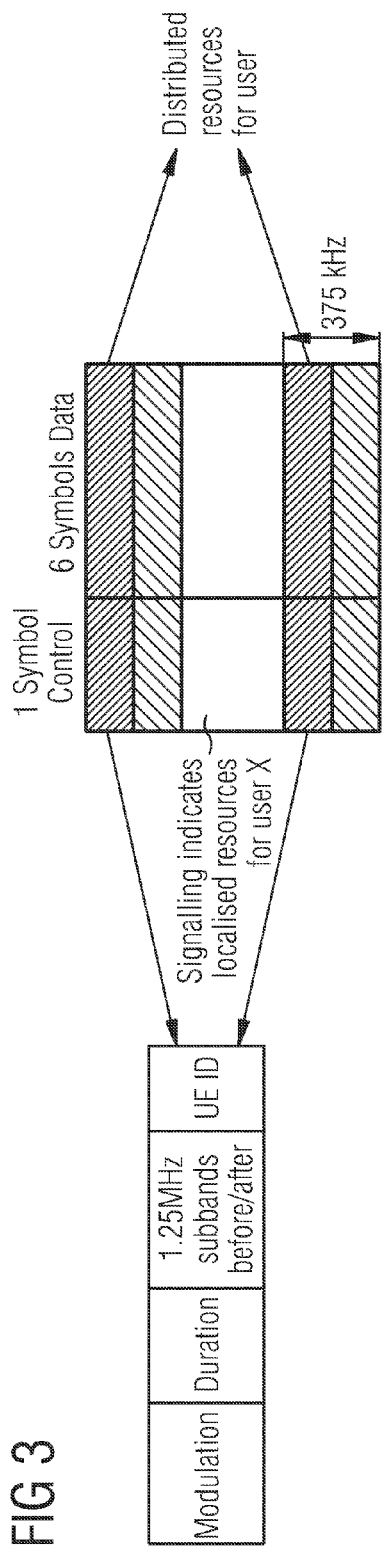
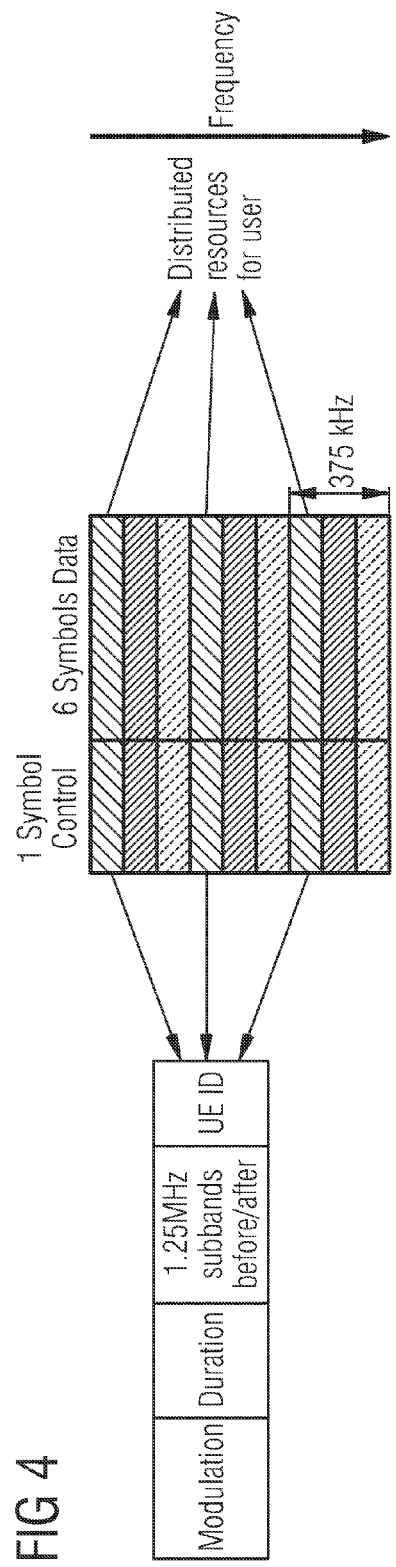
FIG 3
FIG 4

METHOD OF RESOURCE ALLOCATION IN A COMMUNICATION SYSTEM

CROSS REFERENCE TO RELATED APPLICATIONS

This application is based on and hereby claims priority to United Kingdom Application No. 0600814.8 filed on Jan. 17, 2006, and United Kingdom Application No. 0602397.2 filed on Feb. 7, 2006, the contents of which are hereby incorporated by reference.

BACKGROUND

Described below is a method of resource allocation in a communication system, in particular mobile communications.

In orthogonal frequency divisional multiple access (OFDMA) downlink as proposed for Universal Mobile Telecommunications System (UMTS) Terrestrial Radio Access Network (UTRAN) long term evolution (LTE), two methods of transmitting data are suggested. One is localized transmission, in which contiguous groups of tones are allocated to a user and the other is distributed transmission, in which the tones allocated to a user are not contiguous and are distributed across a certain bandwidth. OFDMA has a time and frequency grid comprising 7 symbols, each with a discrete frequency for transmission of information. The quality of a signal from a mobile user device, or user equipment (UE) tends not to change with during the 7 symbols, but does change with frequency. According to the related art, a slow moving UE can report signal quality at range of frequencies and then be scheduled localized resource blocks at frequencies for which the terminal has a good radio channel, but this does not work as well when transmitting to groups, or if the transmitter is fast moving. In the related art, when operating in distributed mode, the transmission is made across the whole bandwidth taking a random choice of available tones. However, if also scheduling a localized transmission, there would be a clash with the tones which have been allocated randomly to the distributed terminal, so it is necessary to notify the localized terminals of which tones are already in use.

SUMMARY

Described below is a method of resource allocation in a communication system, setting specific time and frequency chunks within a band to provide localized and distributed resources for each of localized and distributed users; wherein signalling of resource allocation for each user is in the chunk at the same frequency range as the frequency range of the allocated resource or a subset of the frequency range of the allocated resource. This enables coexistence of localized and distributed transmissions in the same band at the same time, without having to notify the localized user with signalling that allows users to recognise their downlink allocations.

The method may include dividing chunks allocated to distributed resources into sub-chunks and allocating to users a sub-chunk within each chunk of a set of chunks allocated to distributed resources, wherein the number of sub-chunks is determined by the total number of chunks allocated to distributed resources within a band. A band of minimum bandwidth may be formed of three chunks. Users requiring more than the minimum bandwidth may be allocated resources over multiple bands.

Signalling of resource allocation for a user requiring more than the minimum bandwidth may be given in only one band and include an identifier of which earlier or later bands also contain resource for that user. The multiple bands may be adjacent.

All three chunks per band could be allocated to distributed resources, but at least two chunks per band may be allocated for distributed resources. Distributed resources may be allocated to a first and a third chunk. A chunk may include a number of tones during a specified time duration. Tones within a chunk may be allocated to different distributed users, such that the total number of tones available to each user, across all the distributed chunks that have been split between the users, is the same.

Typically, each band has a bandwidth of 1.25 MHz. Allocation of localized and distributed resources to a particular chunk may be determined from blind detection based on the signalling structure, because the signalling is located in the same band as the allocated resources.

The method may be applied to an orthogonal frequency division multiple access communication system.

BRIEF DESCRIPTION OF THE DRAWINGS

These and other aspects and advantages will become more apparent and more readily appreciated from the following description of the exemplary embodiments, taken in conjunction with the accompanying drawings of which:

FIG. 1 illustrates options for multiplexing distributed resource channels;

FIG. 3 illustrates distributed resource allocation on chunks 1 and 3, shared between two users;

FIG. 4 illustrates distributed resource allocation on chunks 1, 2 and 3, shared between three users;

DETAILED DESCRIPTION OF THE PREFERRED EMBODIMENT

Figure 2:
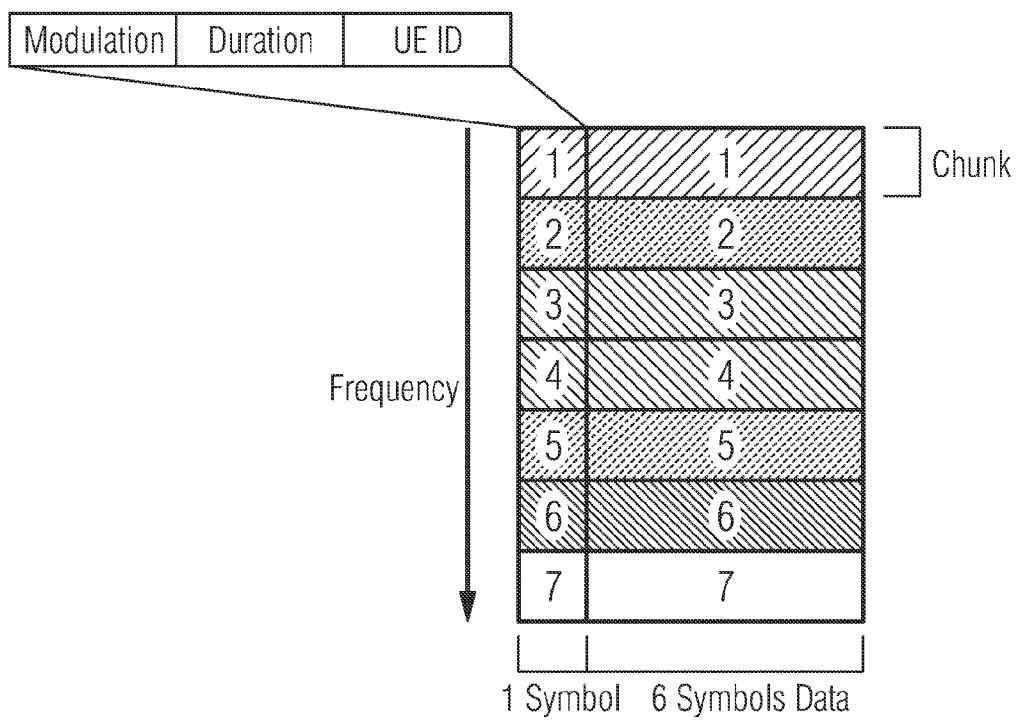
FIG. 2 illustrates local resource allocation.

Reference will now be made in detail to the preferred embodiments, examples of which are illustrated in the accompanying drawings, wherein like reference numerals refer to like elements throughout.

According to the related art, scheduling information is divided into two types: allocation of a user equipment (UE) to a particular portion of the spectrum; e.g. a 5 MHz UE to a portion of the bandwidth of a 20 MHz basestation; and allocation of time/frequency resources to a UE within the operating band as specified. It is assumed that the first type of allocation does not contribute to multi-user diversity (MUD), but is important for radio resource management. Signalling to move users between sub-bands may be carried via (e.g.) radio resource control (RRC) signalling and it is assumed here that the dedicated control channel (DCCH) carrying this signalling will be mapped to the scheduled shared transport channel.

The information in second type of allocation allows for fast management of resources and exploitation of multi user diversity. It is assumed that this information is assigned on resources in the first symbol or two of each sub-frame that are dedicated for carrying this scheduling information. Furthermore, the resource is partitioned into 375 kHz frequency chunks, where each chunk is allocated for the remaining duration of a sub-frame and that this is the minimum unit that can be allocated using fast scheduling signalling.

Two basic approaches have been proposed; one involves placing tones for distributed users within the allocation to localized users and letting the localized users know which tones have been allocated to the distributed users. The second involves setting aside bands of tones, regularly spaced in the frequency domain, for these users. These are illustrated in FIG. 1.

Since localized resources are generally scheduled to frequency chunks for which a user has good signal to interference ratio (SIR), it is desirable to locate the signalling indicating allocation of such resources in the same frequency bands as the resources themselves. Thus, the tones corresponding to the allocated resource in symbol 1 are used for conveying allocation information including modulation type; duration of allocation; optionally, the number of consecutive chunks; and a UE identifier (ID) (cyclic redundancy check (CRC) mask). This can be seen in FIG. 2. Each localized chunk has 25 contiguous tones in all 7 symbols. The first symbol contains allocation information indicating to which user the chunk has been allocated The location of the allocated resource is implicitly known from the location of the signalling. Furthermore, it is assumed that transport format and hybrid automatic repeat request (HARQ) information is conveyed as part of the allocated resource using something equivalent to a transport format combination indicator (TFCI). The "number of consecutive chunks" field may be useful for reducing signalling overhead if the scheduler is likely to allocate consecutive chunks to a user. In the case of multiple contiguous chunks being scheduled to a user, the control symbol contains the control information in the frequency band of the first chunk, including the number of consecutive chunks that are allocated to the user. The tones in the first symbol relating to the remaining consecutive allocated chunks are then assumed by the terminal to be part of the data payload.

For distributed resource allocation, given the lowest bandwidth UE, at 1.25 MHz, then there are only three time and frequency chunks. Thus, for allocating distributed resources, either 1, 2 or 3 chunks can be used for distributed tones. Within each 1.25 MHz segment of a basestation's transmit bandwidth, distributed resources are allocated to either the middle chunk only, the first and last chunks, all 3 chunks, or none of the chunks. Since distributed users might cover 1.25 MHz, or a greater bandwidth, it is desirable for the allocation signalling for distributed users to be distributed itself in some way, in order to improve reliability.

Typically, a constraint is placed on distributed resources that they are allocated in units of 25 tones; i.e. the same allocation unit as used for localized resources.

In the following description, for the sake of clarity, tones allocated to a user within a chunk are depicted as contiguous. Note however that regularly spaced distributions of tones within a chunk, with offsets for different users can also be employed, to further improve performance.

Consider firstly a 1.25 MHz terminal, which can be allocated distributed resources in either the first and third chunks or all 3 chunks (allocation in the second chunk only is not relevant in this case since that would be the same as a localized allocation). Signalling to indicate that distributed resources are scheduled for the user is located in frequency bands 1 and 3 for the case of chunks 1 and 3 being used for distributed resources, or in bands 1, 2 and 3 for the case of all 3 bands being used.

If chunks 1 and 3 are employed, up to 2 users can be accommodated (The first user uses 12 tones in chunk 1 and 13 tones in chunk 2; the other user uses 13 tones in chunk 1 and 12 tones in chunk 2, assuming 25 tones per chunk). The signalling for the first user is indicated in a first OFDM symbol using the first 12 tones in the first frequency band and the first 13 tones in the second band for user 1. Similarly for user 2, the last 13 tones in band 1 and the last 12 tones in band 2 are used. The signalled information includes modulation format; scheduling duration information; the number of 1.25 MHz sub-bands in distributed allocation; in this case 1; the number of consecutive allocations, if applicable and the UE ID as a CRC mask.

The "number of consecutive allocations" field may be used in a similar manner to the "number of consecutive chunks" field for the localized signalling; i.e. in the case that the scheduler allocates a terminal multiple chunks of distributed resources. The signalling in the first resource indicates the allocation and the amount of consecutive units, whilst the control tones relating to the remaining resource units are assumed to be part of the data payload.

If all 3 chunks are allocated to distributed users, the band is split into 3 parts (8 tones in 2 chunks and 9 tones in a third for each user). In a similar manner to the distributed chunks case, the frequency band in the first OFDMA symbol is divided into 3 sections in each band, in which a third of the signalling information is sent for a user. By combining the signalling information across 3 chunks, each scheduling message is decoded.

Figure 5:
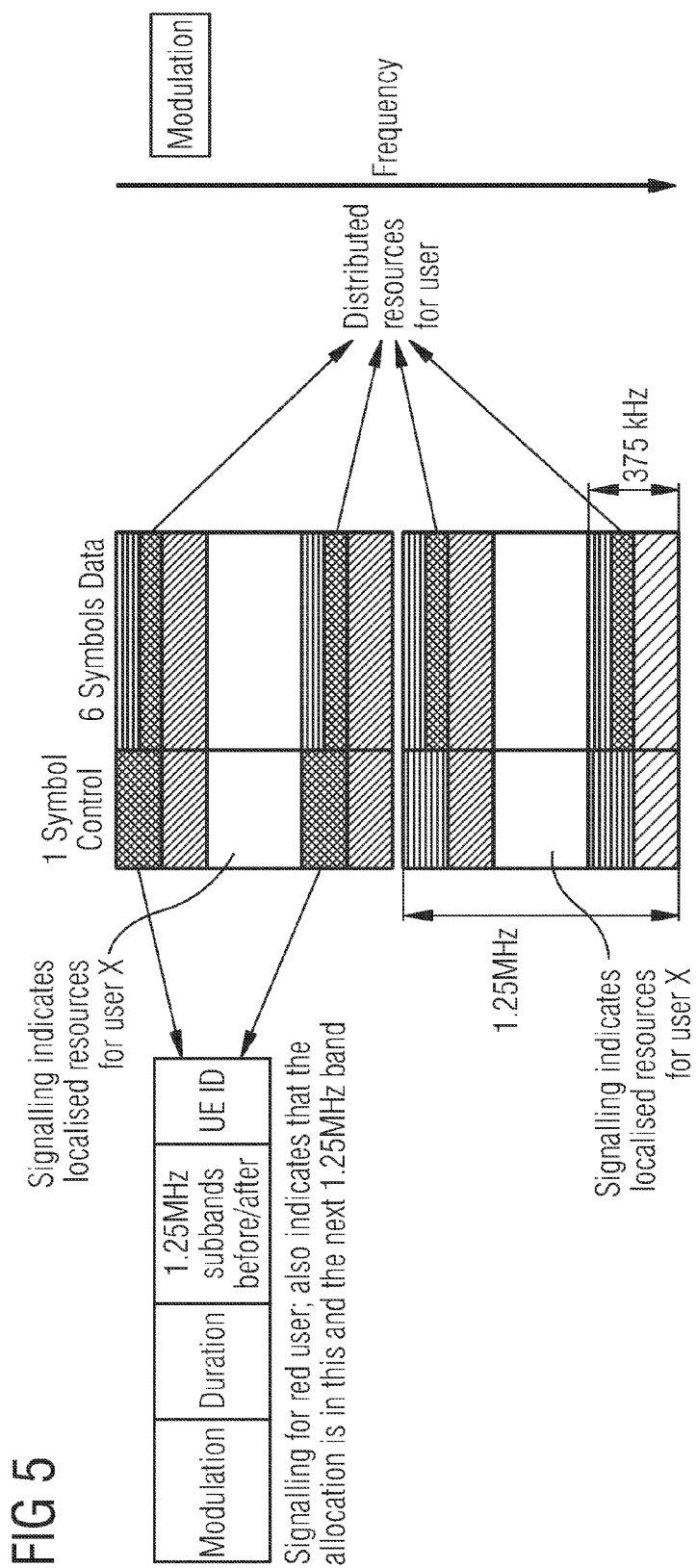
FIG. 5 illustrates distributed resource allocation on chunks 1 and 3 of two sub-bands shared between four users.
Figure 6:
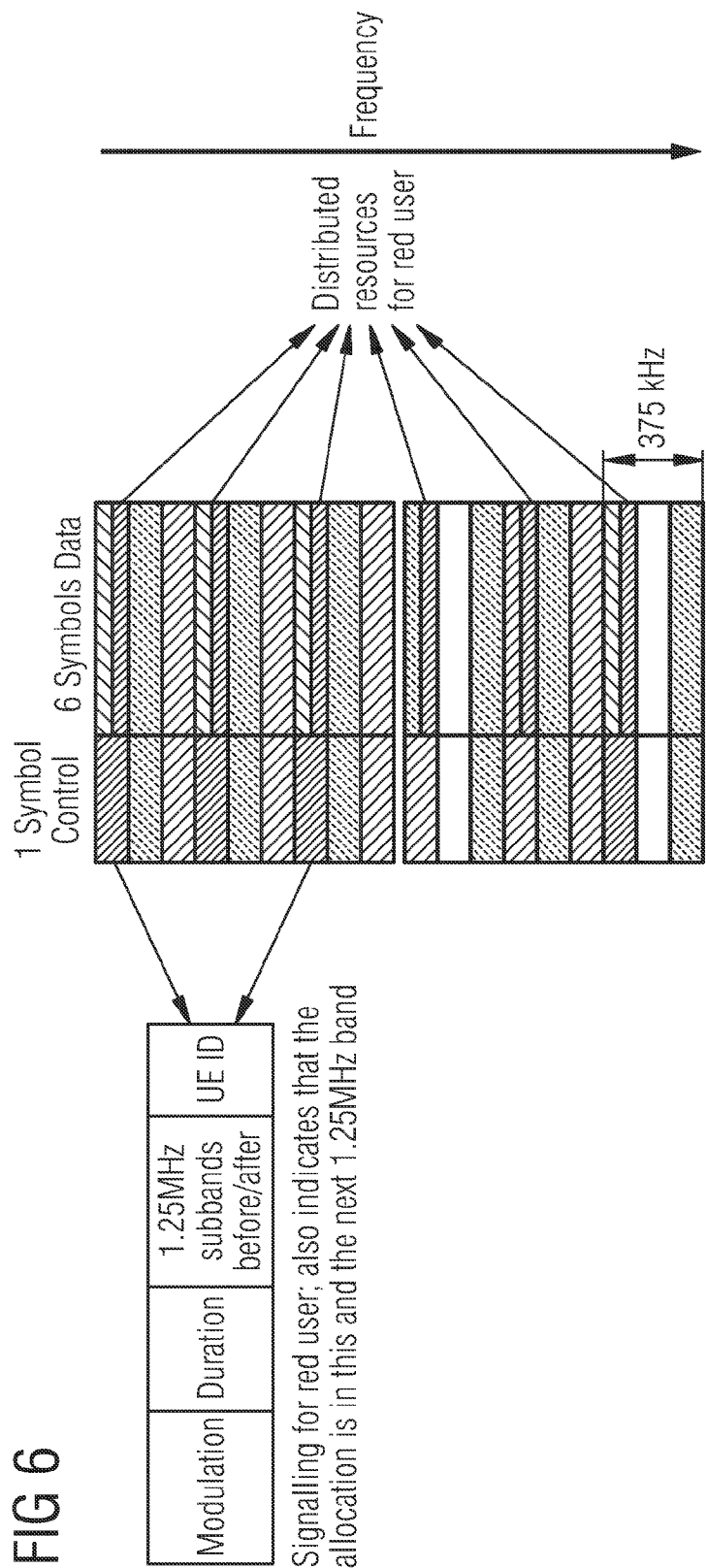
FIG. 6 illustrates distributed resource allocation on chunks 1, 2 and 3 of two sub-bands shared between six users.

Consider now the case of a larger bandwidth terminal. A terminal is allocated 1, 2, 4, 8 or 16 of the 1.25 MHz sub-bands within which distributed resources are transmitted. Suppose that there are two 2.5 MHz users who are allocated 25 distributed tones, which are to be distributed across 2 of the 1.25 MHz sub-bands. Three cases are considered: firstly that chunks 1 and 3 are used for distributed resources in each of the 1.25 MHz bands. Signalling of usage of distributed resources is made in the same manner as described for the 1.25 MHz user; i.e. the distributed frequency bands are split into 2 parts and in the first OFDMA symbol signalling is partially in band 1 and partially in band 3 as in FIG. 3. In this case, the upper part of the allocation is split between the two 5 MHz users that are using 2 of the 1.25 MHz bands. In the first 1.25 MHz band, signalling is placed for user 1. However the "number of 1.25 MHz sub-bands" field is set to +2 in this case. This indicates to the terminal that it should use half of the allocated half chunk in this and the next 1.25 MHz band. The second user is indicated in the second 1.25 MHz band with a number of sub-bands indicated as −2, showing that the user should use the second half of the half chunk for this and the previous 1.25 MHz band. The other half of the allocated distributed chunks are allocated to two further 1.25 MHz users; one in each band. The Distributed resource allocation described is illustrated in FIG. 5, where chunks 1 & 3 are shared between 4 users, of which two users are 2.5 MHz users and have their distributed allocation located in 2 of the 1.25 MHz sub-bands and the other two users are allocated distributed resource within only 1 1.25 MHz sub-band In the case of chunks 1, 2 and 3 being used in each 1.25 MHz band, the same principle is employed for indicating users that utilise two of the 1.25 MHz bands, as shown in FIG. 6. Here, the distributed resource allocation on chunks 1, 2 & 3 is shared between 6 users. Two users are 2.5 MHz users and have their distributed allocation located in 2 of the 1.25 MHz sub-bands. The other four users are allocated distributed resource within only 1 of the 1.25 MHz sub-bands.

Figure 7:
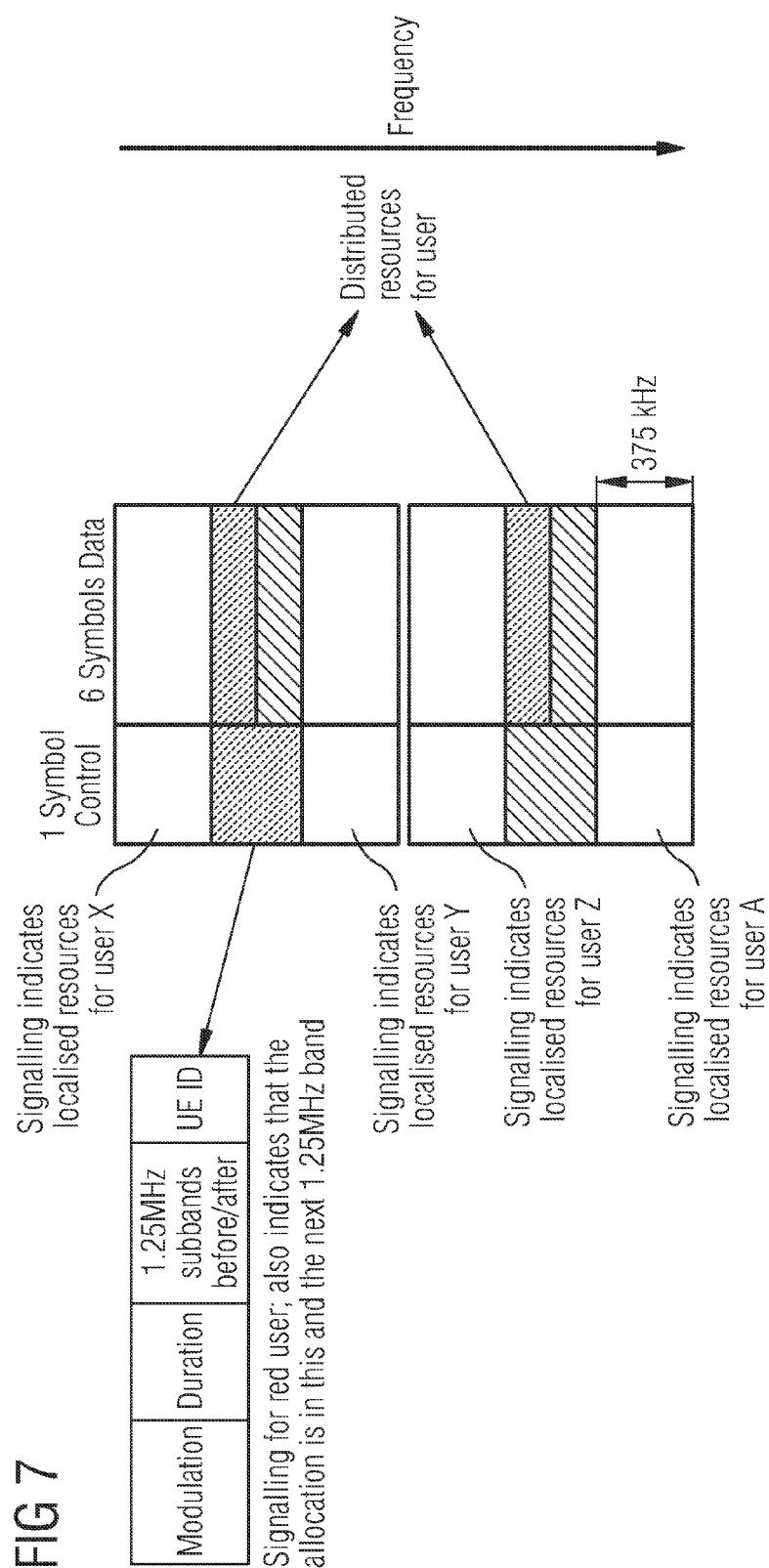
FIG. 7 illustrates distributed resource allocation on chunk 2 of two sub-bands, shared between two users.

In the case of only chunk 2 being used, 2 users can be allocated half of the chunk in each of 1.25 MHz blocks in a similar manner. FIG. 7 shows distributed resource allocation on chunks 2 shared between 2 users, who are both allocated resources in 2 of the 1.25 MHz sub-bands.

Figure 8:
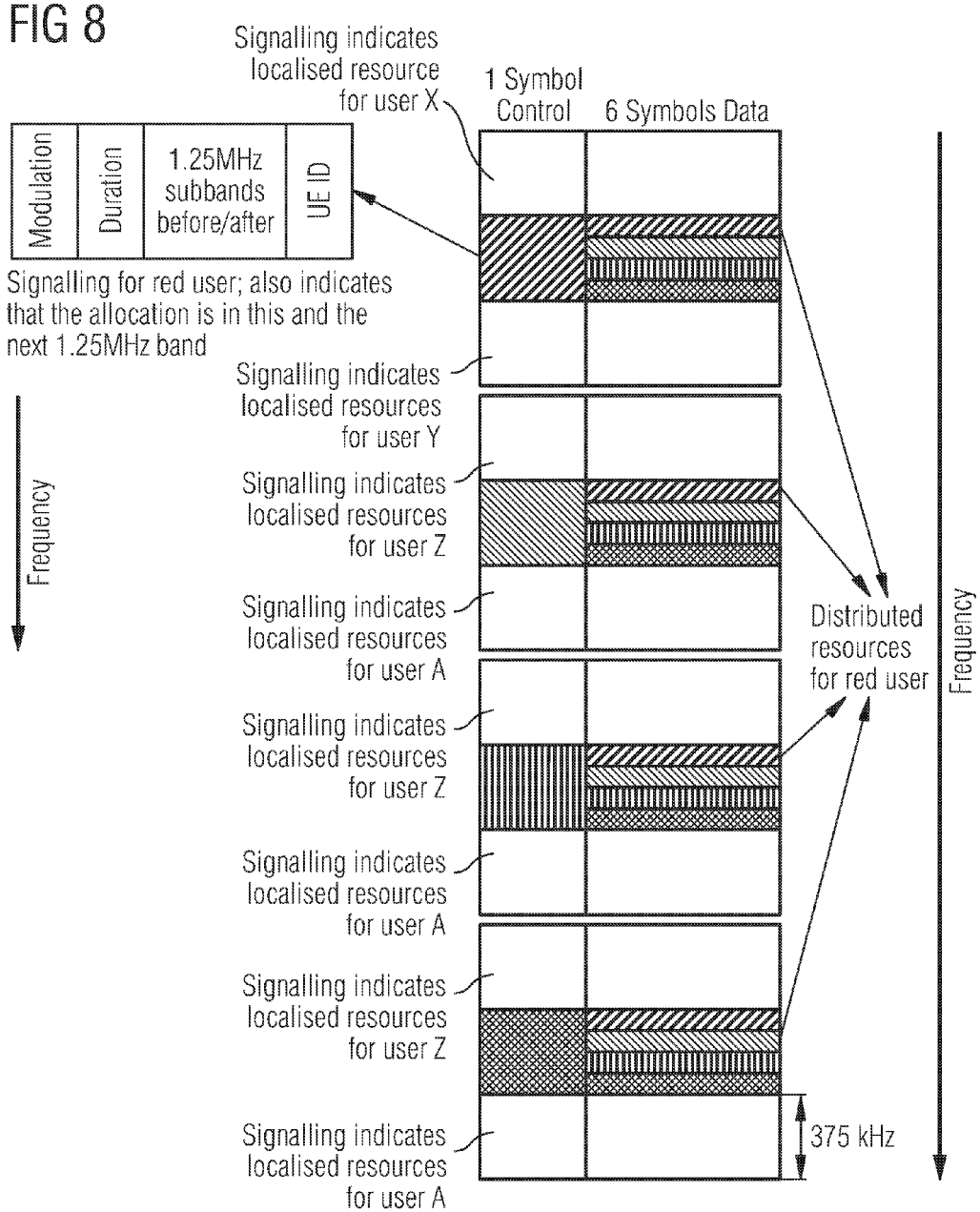
FIG. 8 illustrates distributed resource allocation on chunk 2 on four sub-bands, shared between four users; and, FIG. 9 is a flowchart of a user equipment signalling decoding procedure.

The same principle is applied if a distributed resource is to be split amongst 4 users in 4 of the 1.25 MHz sub-bands. In this case, the chunk, half chunk or third chunk is split between 4 users, with each user being indicated in one of the 1.25 MHz sub-bands. User 1 is indicated in band 1, with a number of chunks indication of 3; i.e. the following 3 chunks are used. User 2 is indicated in the second band with a duration (−1, 2); i.e. the preceding 1.25 MHz band and the following 2 bands are also considered in allocating distributed resources. FIG. 8, shows distributed resource allocation on chunk 2 shared between 4 users, who are all allocated resources in 4 of the 1.25 MHz sub-bands.

Figure 9:
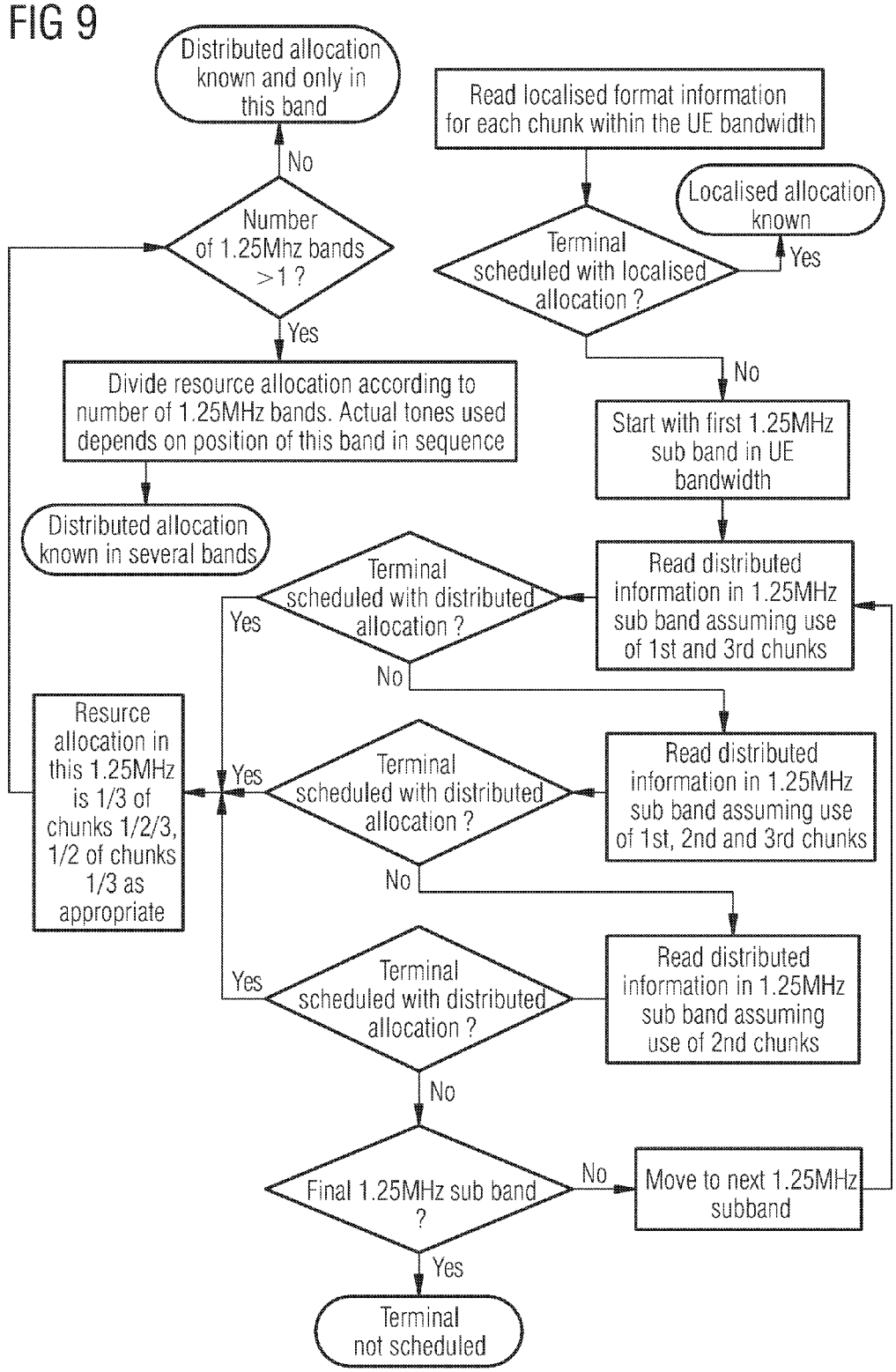

A flowchart of the described process from the terminal point of view is shown in FIG. 9 giving the UE signalling decoding procedure.

The method provides a resource allocation scheme in which the time and frequency of the allocated resources is determined from the time and frequency of the allocation message. A resource allocation procedure for distributed resources is based upon allocating localized resource chunks be used for distributed users and then subdividing these chunks in the frequency domain in a methodical manner according to their number, i.e. 2 chunks are subdivided into 2; 3 chunks are subdivided into 3 and so on. The resource allocation procedure is conveniently based upon 1.25 MHz sub-bands, for which the resource allocations in several sub-bands are further combined for larger resource users, but the resource allocation signalling for each user is kept within one of the 1.25 MHz sub-bands. The resource allocation procedure may be based on 1.25 MHz sub-bands, for which larger bandwidth users are signalled a resource allocation in one of the sub-bands, which also indicates allocated resource in neighbouring sub-bands and from which the time/frequency location of the resource allocation in the neighbouring sub-bands can be inferred.

The resource allocation scheme can be one in which the type of resource allocation (i.e. localised; distributed across 1, 2 or 3 chunks) is not signalled, but is inferred based on blind detection of the signalling, because the signalling is located in the same band as the allocated resources There are a number of advantages of the method, including the fact that allocation signalling is made at the same frequencies as the allocations; so for localized users this leads to the signalling being at frequencies for which radio conditions are good. The allocation signalling is typically de-codable by all UE bandwidths and is self-contained within a sub-frame. There is flexibility to allocate distributed resources across 1.25 MHz or larger bandwidths and no need for localized users to know distributed resource allocations or vice versa. Given the efficient signalling, there is no need to explicitly transmit the location of resource allocation A problem with the method described above is that some degree of blind detection of signalling by a terminal is required. The blind detection is carried out by attempting to decode a number of potential signalling formats or locations and then checking the CRC to see whether information was indeed present. The use of blind signalling detection enables an optimised signalling format that is power and bandwidth efficient. However, potentially such blind detection represents a non insignificant complexity to the terminal, which has to decode the signalling in the minimum possible time in order to maintain low latency. Therefore, the a methodology is provided for adapting a standard Viterbi decoding algorithm in order to mitigate the potential complexity increase caused by the blind detection of the signalling. This implementation brings advantages by reducing complexity for the terminal.

As described above, there four possible formats/locations for signalling within a 1.25 MHz sub-band. For "Localised" users, signalling is located on N contiguous sub-carriers (on one OFDM symbol), where N is the size of a chunk. For distributed users, the signalling may be located either on N contiguous sub-carriers (on one OFDM symbol), where N is the size of a chunk; on the first (or last) N/2 sub-carriers of one chunk and the first (or last) N/2 sub-carriers of a second chunk; or on the first (or middle or last) N/3 sub-carriers of 3 chunks, where a chunk refers to a group of N sub-carriers that are contiguous in frequency.

Thus, to perform blind detection of the type of signalling, the terminal needs to attempt to decode all of these options. Within 1.25 MHz, there are 3 chunks, so this implies that the terminal has to perform each decoding option 3 times in order to perform a full blind detection of the signalling.

According to the related art, each of the different formats in this proposal are decoded using a standard Viterbi decoder prior to checking of the CRC. Thus, if there are M formats, M Viterbi decodings are required. Furthermore, if there are N chunks, N*M decodings are required.

A standard Viterbi decoding has 3 stages. As one moves forward through a decoding trellis, assuming that the stages of the trellis are labelled s=1, 2, . . . S, the optimal path up to stage S is calculated using a so-called "add/compare/select" procedure at each stage, s. The "add/compare/select" involves considering, for each of the possible states at stage s, each possible predecessor state at stage s−1, computing the encoder output and the Hamming distance and for each possible state transition at stage s, choosing (and storing) the lowest distance predecessor state for each current state. The next step is to move backward through the trellis, looking up the recorded predecessor states in order to reconstruct the state sequence and then to move forward through the state sequence to determine the originally transmitted bit-stream. Most of the complexity of the algorithm arises in the first stage of moving forward through the decoding trellis.

Now consider the case in which the signalling could be made up of either N bits from one chunk or N/2 bits from 2 chunks (i.e. two possible coding formats). For the first N/2 bits of the first chunk, the add/compare/select computations are duplicated between two decoding runs. Thus, it is desirable to carry out the computations only once, and store at stage s=N/2 the predecessor table and the accumulated metrics relating to all possible states of the coder at stage N/2.

The first decoding run can proceed by taking the remaining N/2 symbols of the chunk and starting with the accumulated metrics calculated for stage s/2. Similarly the second decoding run can continue by continuing with the N/2 symbols of the second chunk and starting with the accumulated metrics calculated at stage N/2 of the first chunk.

The terminal also needs to decode the second chunk and the second halves of the first and second chunk. Thus, a more optimal procedure is firstly to calculate for the first and second chunks the lookup table and accumulated metrics up to s/2 and then, to calculate a set of accumulated metrics and predecessor tables for the second halves of the chunks. However these need to be calculated for each possible starting state at s/2.

For the first chunk, the accumulated metrics for the first s/2 stages can be combined with each of the accumulated metrics and predecessor tables for each possible state at stage s/2, and the lowest accumulated metric path chosen. Similar computations can be carried out for decoding the second chunk, and when decoding half chunks (e.g. first half chunk of both chunks).

A similar procedure is applied when chunks are split into thirds. The general procedure is that a set of preceding state tables corresponding to each possible state and a set of accumulated metrics is stored at each point at which a chunk can be broken up. In this way, the add/compare/select needs only be carried out once for each data symbol, regardless of the number of different decoding configurations.

Potentially, storage can become an issue, in particular if 3 chunks are involved. The intermediate, i.e. the second component, of each decoding requires predecessor tables to be stored for every combination of start and end state of the ⅓ chunk; if there are 256 states this would imply 65536 tables. To alleviate this issue, an option is for the decoding to be done in a predefined order such that information on the most likely intermediate states can be used to reduce the storage space. For example, if firstly the first ⅓ chunk is processed, then only the first 2 to 4 most likely states can be considered when creating the feedback tables for the second ⅓rd chunk of the first chunk, or the first ⅓rd chunk of the second chunk. In this way, increases in storage are negligible.

Figure 10:
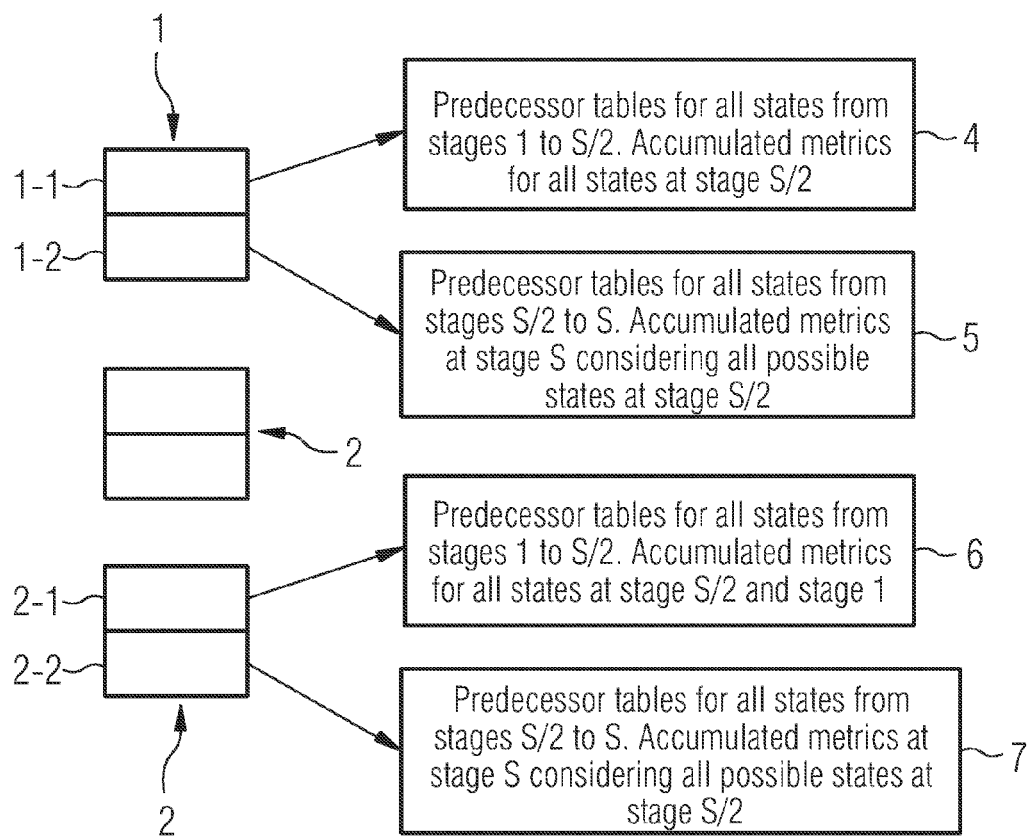
FIG. 10 illustrates an example of how complexity in the method can be reduced.
Figure 11:
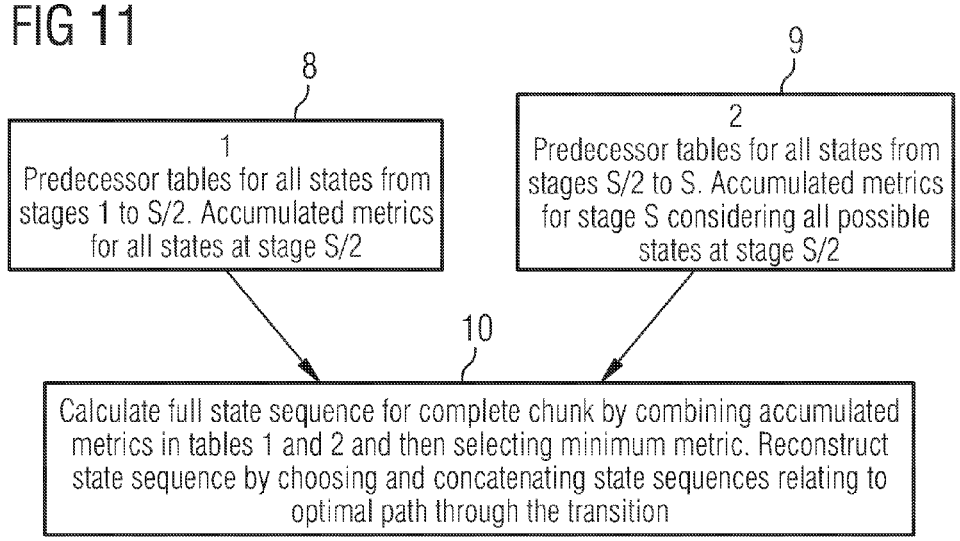
FIG. 11 illustrates an example of how complexity in the method can be reduced; and, FIG. 12 illustrates an example of how complexity in the method can be reduced.
Figure 12:
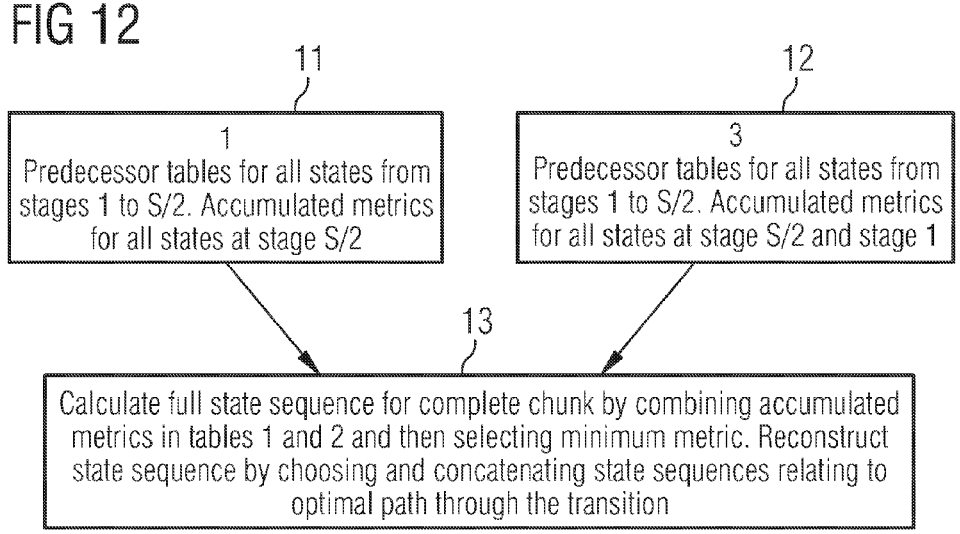

FIGS. 10, 11 and 12 relate to the case in which signalling in chunks 1 and 3, but not 2, is to be detected. The signalling can be entirely located in chunk 1, entirely located in chunk 3, located in the first half 1-1 of chunk 1 and the first half 3-1 of chunk 3 or the last half 1-2 of chunk 1 and the last half 3-2 of chunk 3. In FIG. 10, the Add/Compare/Select is used 4 to build up predecessor tables and accumulated metrics for half chunks of the 3 chunks. For the first half chunk 1-1, one predecessor table is required, together with accumulated metrics for all possible states at stage S/2. For the second half 1-2 of the first chunk, predecessor tables are required 5 for all possible starting states and accumulated metrics for all possible end states, considering starting state 0. For the first half chunk 3-1 of the third chunk, predecessor tables are required 6 for all possible starting states considering end state 0, and all possible end states considering start state 0. For the second half 3-2 of the third chunk, predecessor tables are required 7 for all possible start states considering end state 0.

The amount of storage required is 6*N predecessor tables and accumulated metrics where N is the number of states. The storage requirement can be reduced by evaluating firstly stage 1, then passing information on the likely states S/2 to stages 2 and 3, to eliminate unlikely intermediate states.

In FIG. 11, to decode the first chunk, the accumulated metrics information 8, 9 from the two half chunks is combined 10 to find the optimal intermediate state. The appropriate predecessor table for the second half chunk is then combined with that for the first half chunk to yield a complete state sequence.

In FIG. 12, to decode the first half of chunks 1 and 3, the accumulated metrics information 11, 12 from the two half chunks is combined 13 to find the optimal intermediate state. The appropriate predecessor table for the second half chunk is then combined with that for the first half chunk to yield a complete state sequence An advantage of this feature is that the complexity of blind decoding a number of possible decoding formats is drastically reduced, since there is no duplication of the add/compare/select operation. This allows for lower complexity decoding, or alternatively reduces the latency of the decoding operation whilst enabling a more optimised structuring of control signalling.

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

The invention claimed is:

1. A method of resource allocation in a communication system, comprising:
    setting specific time and frequency chunks within a band to provide localized and distributed resources for each of localized and distributed users where the localized resources allocate contiguous groups of tones to a user and the distributed resources provide non-contiguous groups of tones to the user;
    signalling resource allocation for each user in a chunk at a same frequency range as an allocated resource, or a subset of the frequency range of the allocated resource;
    allocating the localized and distributed resources to a particular chunk determined by blind detection based on a signalling structure, where the signalling is located in a same band as allocated resources.

2. A method according to claim 1, wherein the chunks comprise half or third chunks.

3. A method according to claim 2, wherein an orthogonal frequency division multiple access communication system implements the method.

4. A method according to claim 1, further comprising:
    dividing chunks allocated to distributed resources into sub-chunks; and
    allocating to users a sub-chunk within each chunk of a set of chunks allocated to distributed resources, with a number of sub-chunks determined by a total number of chunks allocated to distributed resources within a band.

5. A method according to claim 4, wherein a band of minimum bandwidth consists of three chunks.

6. A method according to claim 5, further comprising allocating resources over multiple bands to users requiring more than the minimum bandwidth.

7. A method according to claim 6, wherein said signalling of resource allocation for a user requiring more than the minimum bandwidth is given in only one band and includes an identifier of which earlier or later bands also contain resource for that user.

8. A method according to claim 7, wherein the multiple bands are adjacent.

9. A method according to claim 8, wherein said allocating allocates at least two chunks per band for distributed resources.

10. A method according to claim 5, further comprising allocating distributed resources to a first chunk and a third chunk.

11. A method according to claim 10, wherein each chunk includes a number of tones during a specified time duration.

12. A method according to claim 11, further comprising allocating the tones within each chunk to different distributed users, such that an identical number of tones are available to each user, across all distributed chunks that have been split between the users.

13. A method according to claim 12, wherein each band has a bandwidth of 1.25 MHz.

14. A method of decoding a downlink resource allocation which has been allocated by setting specific time and frequency chunks within a band to provide localized and distributed resources for each of localized and distributed users where the localized resources allocate contiguous groups of tones to a user and the distributed resources provide non-contiguous groups of tones to the user, comprising:
   signalling resource allocation for each user in a chunk at a same frequency range as an allocated resource, or a subset of the frequency range of the allocated resource; and
   applying a Viterbi algorithm to generate predecessor tables and accumulated metrics,
   wherein generated tables and metrics for chunks or sub-chunks of a band are stored as partial tables and metrics, and
   wherein the resources are decoded by combining the stored partial tables and metrics relating to the chunks or sub-chunks.

15. A method according to claim 14, further comprising:
   determining a likely start or end state by prediction; and
   calculating tables and metrics only for the predicted states.

16. A method according to claim 14, wherein the sub-chunks include half or third chunks.

17. A method according to claim 14, wherein an orthogonal frequency division multiple access communication system implements the method.

18. A method of resource allocation in a communication system, comprising:
   setting specific time and frequency chunks within a band to provide localized and distributed resources for each of localized and distributed users, where the localized resources allocate contiguous groups of tones to a user and the distributed resources provide non-contiguous groups of tones to the user;
   signalling resource allocation for each user in at least one chunk at a same frequency range as an allocated resource, or a subset of the frequency range of the allocated resource;
   allocating the localized and distributed resources to a particular chunk determined by blind detection based on a signalling structure, where the signalling is located in a same band as allocated resources; and
   allocating to users a sub-chunk within each chunk of a set of chunks allocated to distributed resources, with a number of sub-chunks determined by a total number of chunks allocated to distributed resources within a band.

* * * * *